Sept. 21, 1943.  J. A. ANTONELLI  2,330,104
OIL SEAL CONSTRUCTION
Filed Feb. 23, 1942
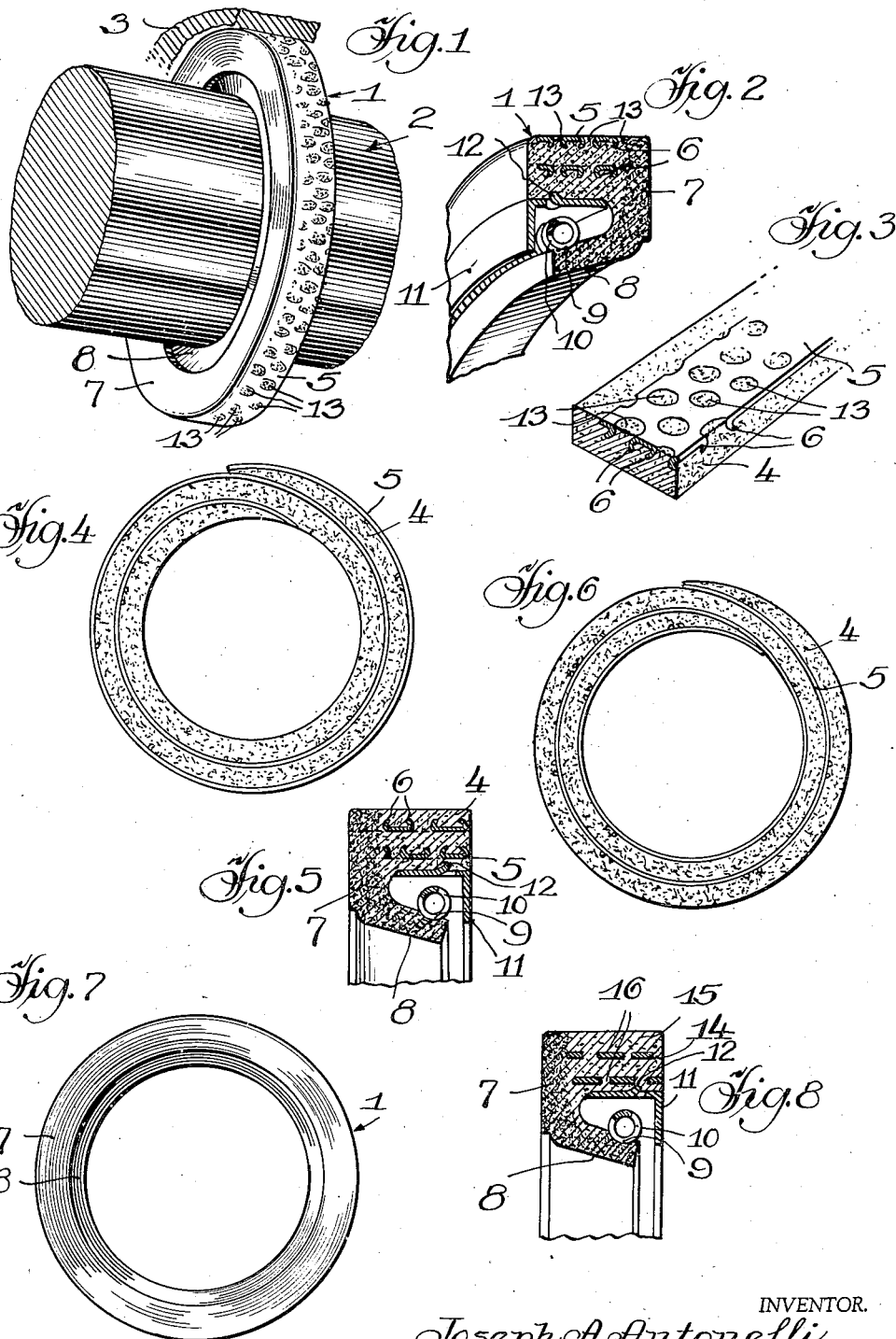
INVENTOR.
Joseph A. Antonelli,
BY Parkinson & Lane
Attys
Witness:
Chas. R. Hursh Patented Sept. 21, 1943

2,330,104

UNITED STATES PATENT OFFICE 2,330,104

OIL SEAL CONSTRUCTION

Joseph A. Antonelli, Elgin, Ill., assignor to Victor Manufacturing & Gasket Company, Chicago, Ill., a corporation of Illinois Application February 23, 1942, Serial No. 431,907

6 Claims. (Cl. 288—2)

The present invention relates to an oil seal of the type adapted to effectively seal the opening or space between relatively rotatable parts or elements such as a rotatable shaft and its surrounding housing or enclosure. In the disclosed embodiment the seal is shown as of the internal type in which it is mounted in a surrounding housing or enclosure with the sealing lip in wiping contact with a rotatable shaft, although it is to be understood that the novel invention is equally well adapted for use as an external type seal in which the seal is press-fitted upon the shaft with its sealing lip in wiping contact with the surrounding housing or enclosure.

It is an important object of the present invention to provide an oil seal or grease retainer constructed of a reinforced plastic composition such as compounded synthetic rubber and requiring no enclosing shell, the seal being mounted directly within or upon the surrounding housing or enclosure, and due to its novel construction and composition, provides a most effective seal between the shaft and its surrounding housing.

The invention further resides in a novel construction of oil seal or grease retainer in which the complete seal including its wiping lip is molded as an integral unit in a single operation, thereby greatly simplifying production and requiring no subsequent enclosure within a retaining shell.

The invention further resides in the novel method and manner of constructing an oil seal or grease retainer including the assembly of a layer of moldable plastic material reinforced with a layer of perforated metal and spirally wound to form a continuous and composite strip, which after the molding operation, forms an integral unit or assembly.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the novel oil seal in operative position about a rotatable shaft.

Figure 2 is a view in vertical cross section through the novel seal.

Figure 3 is a fragmentary view in perspective of the composite strip before assembly.

Figure 4 is a view in side elevation of the spirally wound strip prior to the molding operation.

Figure 5 is a view in vertical cross section through an alternate construction in which the metal layer is located on the interior of the composite strip.

Figure 6 is a view in end elevation of the seal shown in Figure 5 after it has been spirally wound and prior to the molding operation.

Figure 7 is a view in end elevation of the completed seal shown in Figures 5 and 6.

Figure 8 is a view in vertical cross section of a further alternate form of seal.

Referring more particularly to the disclosure of the illustrative embodiment shown in Figures 1 to 4 of the drawing, the novel oil seal 1 is shown associated or surrounding a rotatable shaft 2 with the external cylindrical face or surface of the seal press-fitted into a surrounding housing or enclosure 3. In the disclosed embodiment the oil seal or grease retainer is shown as retained in position solely by the frictional contact or engagement of the material of its external surface with the surrounding housing 3 and thereby completely eliminating the use or requirement of any retaining or enclosing shell.

The novel oil seal is constructed of a continuous length of material formed of alternate layers of a moldable plastic composition such as compounded synthetic rubber or rubber-like material 4, and an outer layer of metal 5 having inwardly projecting prongs or protuberances 6 which are embedded into the plastic composition and thereby form a rigid connection therebetween. This composite strip is then rolled into a spiral form as shown in Figure 4, and to the external face thereof is applied a moldable layer or mass of compounded synthetic rubber or rubber-like material forming an external face 7 and a wiping lip 8. This complete assembly is then loaded into a mold and molded for the desired period under the required pressure and temperature. Preferably the rear face of the sealing lip 8 adjacent its free edge is provided with a depression or recess 9 for the reception of a contractile or garter spring 10. After the seal has been molded and the spring inserted, an L-shaped channel 11 is added to the assembly for retaining the spring against accidental removal and this channel is provided with outwardly projecting prongs or barbs 12 suitably spaced along its cylindrical portion and adapted to become embedded into the plastic composition of the seal.

This construction provides a most effective seal, not only from the standpoint of the sealing contact of its wiping lip 8 with the shaft 2, but also by reason of the fact that the exposed plastic composition on the external cylindrical face of the seal projecting through the openings 13 in the perforated metal strip 5 provides a tight frictional sealing contact with the housing 3.

Figures 5, 6 and 7 show an alternate construction in which the composite strip of plastic material 4 and perforated metal 5 are formed in the manner similar to Figure 3 but this continuous strip is spirally wound as in Figure 6 with the plastic material forming the external surface rather than the internal surface as in Figures 1 to 4, prior to its being loaded into the mold.

In Figure 8 is shown a further alternate construction in which the metal strip 14 is perforated but is not provided with projecting prongs as in the previously mentioned forms. Due to the fact that the synthetic or plastic material 15 when molded will anchor itself within the openings 16 of this perforated sheet, it thereby provides a most rigid and integral construction throughout.

In forming each of the seals described above, I find it preferable to form the plastic and synthetic material 4 and 15 of a harder composition and the external face 7 and wiping lip 8 of a softer and more flexible compounded synthetic rubber.

The present construction of oil seal eliminates the necessity of a metal enclosing or retaining shell and thereby provides for a large reduction in the quantity of metal used. The metal that is used is in the form of a relatively thin strip and then generally of scrap that cannot be used in oil seals of prior types. However, by reason of the novel construction and assembly, this metal gives to the present construction the physical characteristics and rigidity found in metal encased seals, and in addition, provides for a better sealing contact with the surrounding housing than such prior construction.

Having thus disclosed by invention, I claim:

1. An oil seal adapted to be molded in one operation and devoid of any retaining shell, comprising a body composed of composite and spirally disposed alternate layers of compounded synthetic rubber and perforated metal, a spaced resilient sealing lip composed of compounded synthetic rubber bonded directly to the body and adapted to encompass a rotatable shaft, a spring retained within the seal between the body and the sealing lip and adapted to force the lip into wiping and sealing contact with a shaft, and a metal channel secured to the body and protecting the spring against accidental displacement or removal.

2. An oil seal devoid of any encasing housing or retaining shell and comprising a body portion composed of a composite spiral strip including a layer of moldable resilient material and a layer of perforated metal providing a plurality of alternate layers of resilient material and perforated metal, a portion of moldable resilient material integrally bonded to a face of said body portion and forming a spaced, resilient sealing lip, said body portion and sealing lip forming an integral construction reinforced by the spirally disposed layer of perforated metal.

3. An oil seal devoid of any encasing housing or retaining shell and comprising a body portion composed of a composite spiral strip including a layer of moldable resilient, rubber-like material and a layer of perforated metal providing a plurality of alternate layers of resilient material and perforated metal, a portion of moldable resilient material integrally bonded to a face of said body portion and forming a sealing lip spaced from the body portion, said body portion and sealing lip forming an integral construction reinforced by the spirally disposed layer of perforated metal, a spring positioned on the rear face of the sealing lip to force the free edge of the lip into wiping contact with a member to be sealed, and a spring retaining channel anchored in the body portion.

4. In an oil seal adapted to be molded in one operation and devoid of any retaining shell, a molded body of compounded synthetic rubber-like material having an integral, resilient sealing lip spaced from said body and adapted to encompass and have a wiping contact with a rotatable shaft, and a spiral reinforcing strip of perforated metal embedded within the molded body with the rubber-like material anchored within the perforations and providing a body having a plurality of alternate layers of metal and rubber-like material.

5. In an oil seal devoid of any encasing housing or retaining shell, an integral body portion and wiping lip of compounded synthetic rubber, a spiral reinforcing strip of perforated metal having prongs projecting therefrom and embedded within the body portion, the compounded synthetic rubber of the wiping lip having a degree of flexibility greater than that of the body portion.

6. In an oil seal devoid of any encasing housing or retaining shell, an integral body portion comprising a spirally wound composite strip of perforated metal and compounded synthetic rubber providing a plurality of alternate layers of metal and compounded synthetic rubber, and a sealing lip of compounded synthetic rubber bonded to said body portion.

JOSEPH A. ANTONELLI.